Patented Aug. 15, 1950

2,518,607

UNITED STATES PATENT OFFICE 2,518,607

PRINTING INK AND METHOD OF PRINTING

Donald Robert Erickson, Kalamazoo, Mich.

No Drawing. Application January 16, 1946,
Serial No. 641,654

7 Claims. (Cl. 101—426)

This invention relates primarily to the art of printing and printing inks and more particularly to printing ink, a varnish especially adapted for use in printing inks or paper coatings, and a method of printing and preventing offset.

One object is to provide a new and improved varnish for use in printing inks and paper coatings.

Another object is to provide such a varnish which is odorless, thermosetting rather than thermoplastic, highly adhesive, water resistant and highly flexible when printed or coated on a suitable base.

Another object is to provide such a varnish which can be used in a quick setting printing ink which can be printed and immediately subjected to water to prevent offset, but which has water tolerance in that the amounts of water encountered in the air as humidity will not affect the varnish and cause it to set up on the printing press.

Another object is to provide such a varnish in which an increased water tolerance can be obtained by the addition of alkali without any deleterious effect on the physical properties of the varnish such as would be the case if soap were formed by this addition.

Another object is to provide a new and improved method of printing and preventing offset.

Another object is to provide such a method which is capable of use at high speed and in which high pressure applied immediately after printing will not spoil the printing, thus making it suitable for use on high speed presses in which the printing is done on both sides of the base to which the ink is applied.

Other objects and advantages of the invention will appear from the description of this invention which follows:

In carrying out this invention, a glyceryl phthalate is employed as a binder. The particular glyceryl phthalate used for best results is the reaction product of two mols of glycerine and three mols of phthalic anydride. The reaction is carried out until the reaction product is a hard, non-tacky resin which is colloidally dispersible in liquid glycols or polyglycols or water miscible liquid polyglycol ethers. As used herein, "colloidally dispersible" means either soluble or colloidally suspensible in the vehicle.

The desired glyceryl phthalate can be obtained by carrying out the reaction between the glycerine and the phthalic anhydride at a temperature of at least 185° C. for several hours until the reaction product is past the tacky stage.

Water miscible liquid glycols, polyglycols, or polyglycol ethers may be used as vehicles or solvents for the glyceryl phthalate. Specifically, the following solvents or vehicles have proven themselves to be satisfactory: Ethylene glycol, propylene glycol, butylene glycol, diethylene glycol, dipropylene glycol, dibutylene glycol, triethylene glycol, ethyl or methyl ether of triethylene glycol, ethyl or methyl ether of tetrethylene glycol, and the ethyl ether of diethylene glycol. These solvents are all liquid, and water miscible. They may be used individually or in mixtures in carrying out the invention.

This resin has the property of being dispersible in any of the above solvents mixed with a limited quantity of water, but of being insoluble in said solvents mixed with large quantities of water. A varnish thus made with the above solvents is particularly desirable in printing ink because the ink will behave properly on the press even when high humidities are encountered in the pressroom, but offset may be prevented by applying water to the printed ink to separate the resin from the solvent.

The resin also has the property of reacting with an alkali to produce a salt of the glyceryl phthalate rather than a soap. When the salt of an alkali metal such as sodium or an ammonium salt of the glyceryl phthalate is added to the glyceryl phthalate in a varnish, the water tolerance is increased and a varnish made in this way is highly satisfactory for a printing ink since the body, tack and length of the ink is not deleteriously affected as would be the case if a soap were added instead of the salt.

The mere addition of the alkali to the resin will convert the desired amount to the salt and in this way water tolerance can be increased.

The varnish is preferably made with equal parts by weight of resin and solvent or, if the salt of the resin is added, 9 parts by weight of resin are used to one part by weight of the salt and 10 parts by weight of the solvent.

One example of the invention in an ink is as follows:

50 parts by weight of the above described glyceryl phthalate,
50 parts by weight of diethylene glycol,
10 parts by weight of carbon black,
10 parts by weight of toning blue, are mixed in a three roller ink mill until the pigment is fully dispersed in the varnish.

Another example is as follows:

45 parts by weight of the above described glyceryl phthalate, 5 parts by weight of the sodium salt thereof,
50 parts by weight of diethylene glycol,
10 parts by weight of carbon black,
10 parts by weight of toning blue, are mixed on a three roller mill until the pigment is dispersed in the varnish.

Another example is as follows:

50 parts by weight of the above described glyceryl phthalate,
50 parts by weight of propylene glycol,
10 parts by weight of carbon black,
10 parts by weight of toning blue, are mixed in a three roller ink mill until the pigment is fully dispersed in the varnish.

Another example is as follows:

45 parts by weight of the above described glyceryl phthalate,
5 parts by weight of the sodium salt thereof,
50 parts by weight of propylene glycol,
10 parts by weight of carbon black,
10 parts by weight of toning blue, are mixed on a three roller mill until the pigment is dispersed in the varnish.

Another example is as follows:

50 parts by weight of the above described glyceryl phthalate,
50 parts by weight of ethyl ether of triethylene glycol,
10 parts by weight of carbon black,
10 parts by weight of toning blue, are mixed on a three roller mill until the pigment is fully dispersed in the varnish.

Another example is as follows:

45 parts by weight of the above described glyceryl phthalate,
5 parts by weight of the sodium salt thereof,
50 parts by weight of ethyl ether of triethylene glycol,
10 parts by weight of carbon black,
10 parts by weight of toning blue, are mixed on a three roller mill until the pigment is dispersed in the varnish.

Another example is as follows:

50 parts by weight of the above described glyceryl phthalate,
50 parts by weight of the ethyl ether of triethylene glycol,
10 parts by weight of chrome yellow, are mixed on a three roller mill until the pigment is dispersed in the varnish.

In carrying out the invention, the amounts can be varied to give the desired body and other properties to the ink, the pigment may be changed and instead of the specific solvents mentioned, the solvents may be the other liquid glycols or polyglycols or liquid water miscible polyglycol ethers referred to above, or mixtures thereof.

The above inks have sufficient water tolerance for use in the conditions of humidity ordinarily encountered in press rooms. The inks using the soluble salts of the glyceryl phthalates in addition to the glyceryl phthalates, however, have higher water tolerance.

Immediately after printing with the above inks, they may be treated to prevent offset. In the case of ink using only the glyceryl phthalate as a binder, this may be done by applying water. In the case of ink using the glyceryl phthalate and its alkali metal salt, it is preferable to apply an aqueous solution of a metal salt which will react with the glyceryl phthalate and its alkali metal salt to form a phthalate which is not soluble in the vehicle. Such metal salts are those of barium, calcium and zinc and more particularly, calcium chloride, barium chloride, zinc chloride or zinc sulphate.

The metal salts may be used in any case but are not necessary if the alkali metal salt of the glyceryl phthalate is not present.

When the alkali metal salt of the phthalate is used, the precipitation can be obtained using an ammonium salt in the water which is applied after printing. Heat eliminates the resulting amine.

If the ammonium salt of the glyceryl phthalate is used in place of the alkali metal salt of the glyceryl phthalate, application of water will prevent offset and heat is used to eliminate the amine.

The water or solutions are applied to the printed sheet by means of dampening rollers much the same as one used on offset lithographic presses to dampen or wet the printing plate. It is preferable to use a metal roll for this purpose and to have its surface porous to hold the water therein. There is no offset onto such a roll or on other paper, and after dampening the printed film, there is no offset from the printed film to adjacent paper. Another film of ink can be applied immediately. The distance needed for setting the ink after each impression is only the few inches in which to place the roll. The water or solution can be applied in any other way, but the roll is preferred because it takes less space and is less complicated than other means.

The printed film has high scuff, rub and smut resistance. It is flexible and the resin has most desirable interfacial tension characteristics. The film forming resin has a high enough molecular weight to have film forming properties most desired in the field of printing inks and coatings.

It will be apparent that wide variations can be made in carrying out this invention and it is not intended to be limited to the specific form of the invention described above except as set forth in the claims.

What I claim as my invention and desire to secure by Letters Patent is:

1. A varnish adapted for use in a printing ink or paper coating comprising 9 parts by weight of thermosetting, water-insoluble, glyceryl phthalate, one part by weight of an alkali metal salt thereof colloidally dispersed in 10 parts by weight of a vehicle selected from the group consisting of water miscible liquid glycols, and polyglycol ethers.

2. A varnish adapted for use in a printing ink or paper coating comprising 9 parts by weight of the thermosetting, water-insoluble, non-tacky, hard reaction product of 2 mols of glycerine and 3 mols of phthalic anhydride, one part by weight of an alkali metal salt thereof colloidally dispersed in 10 parts by weight of a vehicle selected from the group consisting of water miscible liquid glycols, and polyglycol ethers.

3. The method of printing and preventing offset comprising printing on a suitable base with an ink having a pigment and a varnish comprising thermosetting, water-insoluble, glyceryl phthalate and an alkali metal salt thereof colloidally dispersed in a vehicle selected from the group consisting of water miscible liquid glycols, and ethers of polyglycols, and immediately after printing precipitating the glyceryl phthalate from the surface of the printed ink by applying thereto a water solution of a salt of a metal the phthalate of which is insoluble in said vehicle.

4. The method of printing and preventing offset comprising printing on a suitable base with an ink having a pigment and a varnish comprising thermosetting, water-insoluble, glyceryl phthalate and an alkali metal salt thereof colloidally dispersed in a vehicle selected from the group consisting of water miscible liquid glycols, and ethers of polyglycols, and immediately after printing precipitating the glyceryl phthalate from the surface of the printed ink by applying thereto a water solution of a salt of a metal which will react with said reaction product to produce a phthalate insoluble in said vehicle.

5. A printing ink comprising a pigment dispersed in a varnish comprising nine parts by weight of thermosetting, water-insoluble, glyceryl phthalate, one part by weight of an alkali metal salt thereof, and a vehicle selected from the group consisting of water miscible liquid glycols, and polyglycol ethers.

6. A printing ink comprising a pigment dispersed in a varnish comprising nine parts by weight of the thermosetting, water-insoluble, hard, non-tacky reaction product of 2 mols of glycerine and 3 mols of phthalic anhydride, one part by weight of an alkali metal salt thereof, and a vehicle selected from the group consisting of water miscible liquid glycols, and polyglycol ethers.

7. The method of printing and preventing offset comprising printing an ink comprising thermosetting, water-insoluble, glyceryl phthalate and an alkali metal salt thereof colloidally dispersed in a vehicle selected from the group consisting of water miscible liquid glycols, and polyglycol ethers and a pigment, and immediately after printing applying to the surface of the printed ink an aqueous solution of a salt of a metal selected from the group consisting of barium, calcium and zinc.

DONALD ROBERT ERICKSON.

REFERENCES CITED

The following references are of record in the file of this patent:

UNITED STATES PATENTS

| Number | Name | Date |
| --- | --- | --- |
| 1,640,596 | Chatham | Aug. 30, 1927 |
| 2,063,239 | Gabriel | Dec. 8, 1936 |
| 2,220,621 | Ellis | Nov. 5, 1940 |
| 2,261,798 | Erickson | Nov. 4, 1941 |
| 2,267,276 | Hager | Dec. 23, 1941 |
| 2,385,613 | Davis | Sept. 25, 1945 |
| 2,400,519 | Kroeger, et al. | May 21, 1946 |

FOREIGN PATENTS

| Number | Country | Date |
| --- | --- | --- |
| 307,877 | Great Britain | Oct. 31, 1929 |